Figure 1:
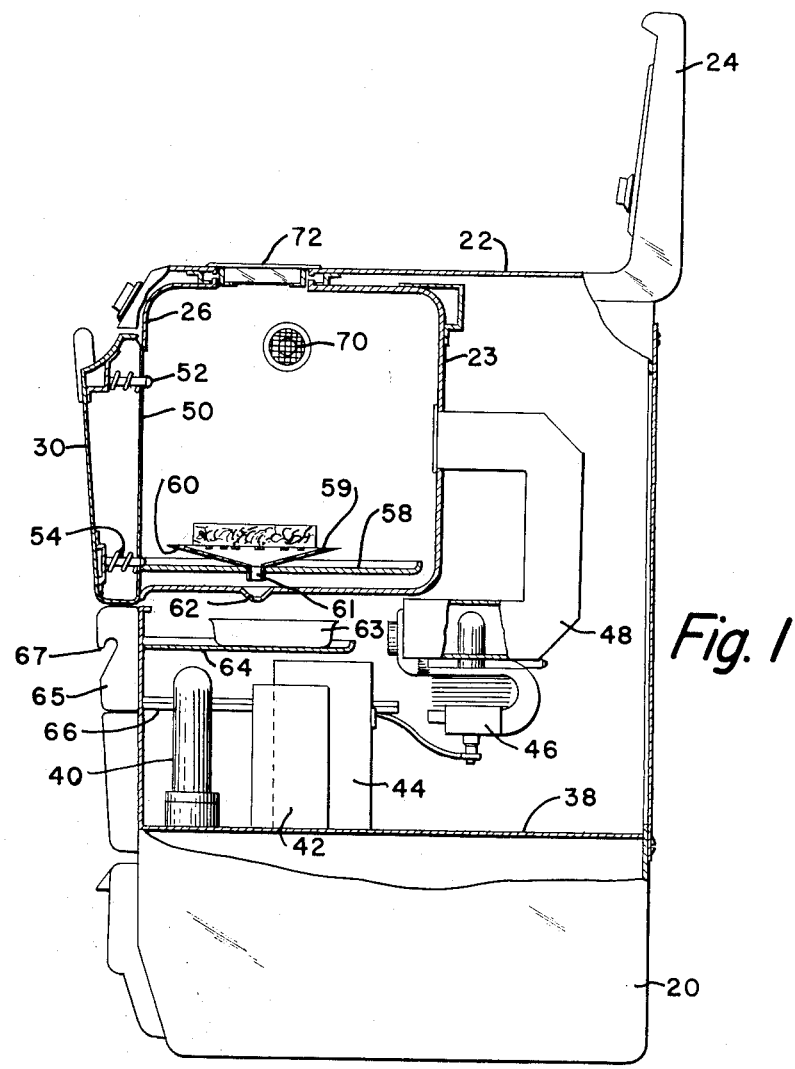

Sept. 11, 1956    G. B. LONG ET AL    2,762,893
ELECTRONIC OVEN WITH LIQUID COLLECTOR
Filed July 17, 1952

INVENTOR.
George B. Long
James M. Valentine
BY Willits, Hardman and Fehr
attorneys

United States Patent Office 2,762,893
Patented Sept. 11, 1956

2,762,893

ELECTRONIC OVEN WITH LIQUID COLLECTOR

George B. Long, Dayton, and James M. Valentine, Vandalia, Ohio, assignors to General Motors Corporation, Dayton, Ohio, a corporation of Delaware Application July 17, 1952, Serial No. 299,306

4 Claims. (Cl. 219—10.55)

This invention relates to a domestic appliance and more particularly to domestic electronic ovens.

In electronic ovens, juices, grease and water are driven from the food in somewhat the same way as in conventional ovens. These liquids may be somewhat of a nuisance in conventional ovens. However, in electronic ovens these liquids not only are a nuisance but they also cause losses in efficiency and speed and permit complications in securing even cooking.

It is an object of my invention to provide an arrangement for an electronic oven wherein high frequency wave energy is prevented from obtaining access to substantially all liquids produced in cooking in the oven.

It is another object of my invention to provide an arrangement for an electronic oven by which substantially all liquids driven out of the food are removed as they are driven out to a place where they will not be acted upon by the high frequency wave energy.

These objects are attained by providing a liquid collecting means beneath the food supporting rack which has a liquid catching means somewhat in the shape of a funnel which carries the liquid dripping from the food into a receptacle either located outside of the oven or provided with suitable wave shielding arrangement for substantially preventing wave energy from gaining entrance to it.

Further objects and advantages of the present invention will be apparent from the following description, reference being had to the accompanying drawings wherein a preferred form of the invention is clearly shown.

Figure 2:
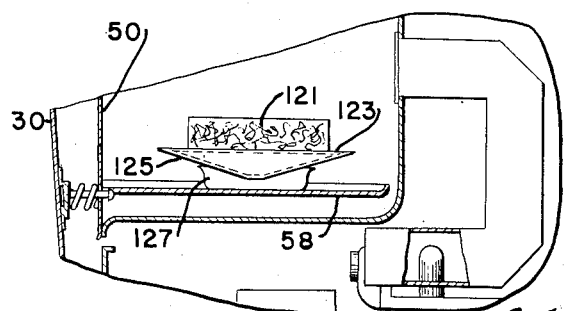

In the drawing:

Figure 1 is a vertical sectional view partly diagrammatic through a domestic electric range embodying one form of my invention; and Figure 2 is a fragmentary view somewhat similar to Figure 1 showing a modified form of the invention.

Referring now to the drawing there is shown a domestic electric range 20 having a top sheet metal surface 22 and a back panel 23. Beneath the top surface 22 there is a relatively small oven liner 23. This oven liner 23 has an opening at the front surrounded by suitable flanges 26 extending around its perimeter. The front of the range is provided with an oven door 30 which is preferably pulled out horizontally like a drawer. Beneath the oven 23 there is provided a bottom shelf 38 which supports an electronic apparatus.

This apparatus includes a row of rectifier tubes 40, a filament transformer 42 and a plate transformer 44 which is connected to the magnetron oscillator tube designated by the reference character 46. The magnetron oscillator tube 46 extends into the lower portion of a wave guide 48. The upper portion of this wave guide 48 extends through an aperture in the central portion of the rear wall of the oven liner 23 and opens directly into the interior of the oven compartment. The wave guide 48 is closed at its lower end so that all of the waves will be transmitted through the wave guide into the interior of the oven.

To insure that the waves do not escape from the oven, the door 30 is provided with an inner spring mounted imperforate metal panel 50 mounted upon four pins 52 projecting inwardly from the outer framework of the door 30. Upon the pins within the door are four compression type coil springs 54 which normally tend to expand to urge the plate 50 into firm sealing engagement with the flange 26 surrounding the door opening of the oven liner 23. Attached to this plate 50 by a cantilever arrangement is a cantilever food support 58.

When food is placed on such a rack and cooked in the oven, juices, grease and water are driven out of the food and are normally collected at some place within the oven. While metals reflect the wave energy and some other materials are not heated by the wave energy, these liquids do absorb wave energy and are heated. They cause foods that rest in these liquids to cook slower due to the fact that these liquids conduct heat from the food to the food supporting pan which normally could remain cool. Also these liquids themselves absorb wave energy. When heated, they produce vapors which condense on the walls of the oven. This vapor condensation makes it necessary to clean the oven walls after the cooking operation is completed.

To overcome these difficulties, we provide a food rack 59 of low dielectric loss plastic material or metal upon the funnel-shaped liquid catching member 60 also of low dielectric loss plastic material or metal which has its discharge outlet 61 extending through the support 58. This discharge outlet 61 discharges into a conically shaped depression in the bottom of the oven liner 23. The aperture in this conically shaped depression 62 discharges directly into the receptacle 63 provided beneath the oven liner 23. This liquid catching receptacle 63 is supported upon the cantilever support 64 having its front end fastened to and supported in cantilever fashion by a small door 65. This small door 65 is supported upon the sliding support 66 provided within the range 20. This door 65 is directly beneath the main oven door 30 and may be provided with a suitable handle 67 by which it can be opened and the receptacle 63 removed for removal of the liquids collecting therein. Not only will the juices, water and grease from the food be collected in the receptacle 63, but any liquids which condense upon the inner surface of the walls of the oven liner 23 will collect on the bottom and drain from the oven liner through the conically shaped discharge opening 62 into the receptacle 63.

The conically shaped discharge opening 62 is sufficiently small that substantially no wave energy will escape through it. It has been found that if the aperture is less than ⅛ the wave length that no substantial amounts of the wave energy will pass through it. For this reason the aperture is made of a small diameter such as ½ inch.

The oven 23 may contain an illuminating light 70 and a top window 72 for viewing the cooking operation.

In Figure 2, there is shown another form of the invention in which the food 121 is supported upon a rack 123. This rack 123 may be of metal but preferably is of a suitable plastic. The rack 123, however, rests upon a funnel shaped liquid catching means 125 preferably of metal which reflects the wave energy. The extreme bottom portion of this liquid catching means 125 is provided with a small outlet opening. This liquid catching means rests directly upon a metal pan 127 which also reflects the wave energy. When the food 121 is being cooked the liquids drain onto the liquid catching means 123 and through its bottom aperture into the pan 127. The interior of the pan 127 is shielded from the wave energy since its bottom and sides are of imperforate metal and the top portion is covered by the metal liquid catching means. The aperture in the liquid catching means is sufficiently small that all but an insignificant portion of the wave energy will be excluded from the interior of the pan 127. In this way the liquids are collected in a location where wave energy is excluded and they are, therefore, not heated.

The pan 127 may rest upon the cantilever support 58 which is supported by the panel 50 of the door 30. The remaining portions of the range are the same as is illustrated in Figure 1 excepting that the door 65 and the pan 63 and necessary accessories are omitted.

We have, therefore, provided an arrangement whereby liquids are collected in a location shielded from the wave energy.

While the form of embodiment of the invention as herein disclosed constitutes a preferred form, it is to be understood that other forms might be adopted as may come within the scope of the claims which follow.

What is claimed is as follows:

1. A domestic electric range having an electronic oven including metal walls enclosing an oven compartment, a draining food supporting rack within said compartment, means for applying high frequency wave energy to said oven compartment, and liquid collecting means beneath said rack for collecting liquid from the food on the rack including high frequency wave shielding means for shielding the collected liquid from high frequency wave energy in said oven.

2. A domestic electric range having an electronic oven including metal walls enclosing an oven compartment, a perforated food supporting rack extending substantially in a horizontal plane within said compartment, means for applying high frequency wave energy to said oven compartment, and liquid collecting means beneath said rack for collecting liquid from the food on the rack, said liquid collecting means including a liquid catching means having an outlet for discharging liquid therefrom and a receptacle below said liquid catching means for collecting liquid from said outlet, said oven including means for shielding said receptacle from the wave energy in said oven.

3. A domestic range having an electronic oven including metal walls enclosing an oven compartment, a perforated food supporting rack extending substantially in a horizontal plane within said compartment, a funnel shaped liquid catching means extending throughout the area beneath said rack and having an outlet, said rack being provided with openings through which liquids emerging from the food on the rack fall into the catching means, a metal receptacle located beneath said outlet for collecting liquids from said catching means, said liquid catching means being of metal and being located on the top of said receptacle to serve as a cover for shielding the collected liquid from the high frequency wave energy.

4. A domestic range having an electronic oven including metal walls enclosing an oven compartment, a perforated food supporting rack extending substantially in a horizontal plane within said compartment, a funnel shaped liquid catching means extending throughout the area beneath said rack and having an outlet, said rack being provided with openings through which liquids emerging from the food on the rack fall into the catching means, a metal receptacle located beneath said outlet for collecting liquids from said catching means, said receptacle being located outside the oven, the oven walls being provided with an opening directly beneath said outlet.

References Cited in the file of this patent

UNITED STATES PATENTS

| | | |
|---|---|---|
| 2,362,757 | Lang | Nov. 14, 1944 |
| 2,497,670 | Hanson et al. | Feb. 14, 1950 |
| 2,500,676 | Hall et al. | Mar. 14, 1950 |
| 2,504,109 | Dakin et al. | Apr. 18, 1950 |
| 2,525,062 | Berg | Oct. 10, 1950 |
| 2,569,775 | Pearce | Oct. 2, 1951 |
| 2,585,970 | Shaw | Feb. 19, 1952 |
| 2,612,596 | Gross | Sept. 30, 1952 |

FOREIGN PATENTS

| | | |
|---|---|---|
| 622,013 | Great Britain | Apr. 26, 1949 |
| 623,040 | Great Britain | May 11, 1949 |